United States Patent [19]

Terng

[11] Patent Number: 5,633,942
[45] Date of Patent: May 27, 1997

[54] MICROPHONE MOUNTING STRUCTURE OF A KEYBOARD

[75] Inventor: Jay Terng, Taipei, Taiwan

[73] Assignee: Silitek Corporation, Taipei, Taiwan

[21] Appl. No.: 705,804

[22] Filed: Aug. 30, 1996

[51] Int. Cl.$^6$ .................................................. H04R 25/00
[52] U.S. Cl. ............................ 381/169; 381/91; 381/168
[58] Field of Search ................................. 381/169, 168, 381/87, 91, 115, 113, 114, 188, 205; 248/178, 121, 408

[56] References Cited

U.S. PATENT DOCUMENTS

| | | | |
|---|---|---|---|
| 5,347,630 | 9/1994 | Ishizawa et al. | 395/164 |
| 5,438,530 | 8/1995 | Bettini | 364/709.11 |

*Primary Examiner*—Sinh Tran
*Attorney, Agent, or Firm*—Beveridge, DeGrandi, Weilacher & Young LLP

[57] ABSTRACT

A microphone mounting structure including a keyboard having defining a horizontal bottom chamber near the rear side and a plurality of equally spaced vertical locating grooves inside the horizontal bottom chamber, a slide carrier slidably mounted in the horizontal bottom chamber of the keyboard, the slide carrier having a pair of vertical locating ribs detachably forced into engagement with the vertical locating grooves of the keyboard, and a supporting block at the front side, the supporting block having a microphone holder mounting hole and two locating holes spaced at an angle around the microphone holder mounting hole, a microphone holder having a mounting rod coupled to the microphone holder mounting hole of the supporting block of the slide carrier, a locating rib forced into engagement with one locating hole of the supporting block of the slide carrier, and a plug hole spaced from the mounting rod at right angles, and a microphone mounted in the plug hole of the microphone holder.

4 Claims, 3 Drawing Sheets

5,633,942

MICROPHONE MOUNTING STRUCTURE OF A KEYBOARD

BACKGROUND OF THE INVENTION

The present invention relates to computer keyboards, and relates more particularly to the microphone mounting structure of a computer keyboard which comprises a slide carrier slidably mounted in a horizontal bottom chamber of the top cover shell of the keyboard, and a microphone holder adjustably coupled to the slide carrier to hold a microphone between a horizontal position and a vertical position.

Regular computer keyboards are commonly designed for signal input through a set of key switches. Therefore, these computer keyboards cannot pick up the user's voice for inputting into the computer system.

SUMMARY OF THE INVENTION

It is one object of the present invention is to provide a computer keyboard which is equipped with a microphone for picking up the user's voice. It is another object of the present invention to provide a microphone mounting structure for a computer keyboard which can be conveniently adjusted to the desired working position. According to the present invention, the microphone mounting structure comprises a keyboard having defining a horizontal bottom chamber near the rear side and a plurality of equally spaced vertical locating grooves inside the horizontal bottom chamber, a slide carrier slidably mounted in the horizontal bottom chamber of the keyboard, the slide carrier having a pair of vertical locating ribs detachably forced into engagement with the vertical locating grooves of the keyboard, and a supporting block at the front side, the supporting block having a microphone holder mounting hole and two locating holes spaced at an angle around the microphone holder mounting hole, a microphone holder having a mounting rod coupled to the microphone holder mounting hole of the supporting block of the slide carrier, a locating rib forced into engagement with one locating hole of the supporting block of the slide carrier, and a plug hole spaced from the mounting rod at right angles, and a microphone mounted in the plug hole of the microphone holder.

DETAILED DESCRIPTION OF THE PREFERRED EMBODIMENT

Figure 1:
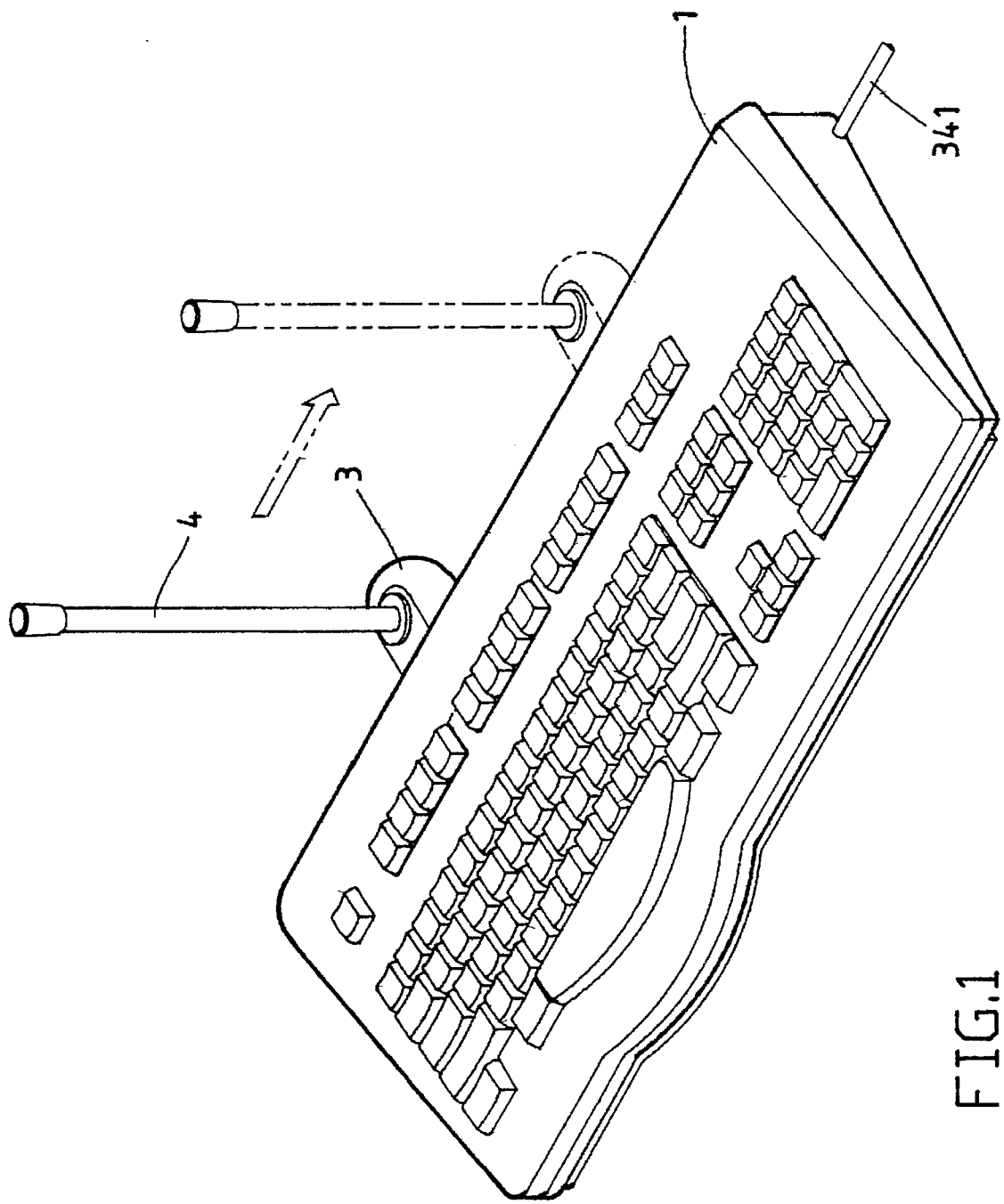
FIG. 1 is an elevational view of the present invention showing the microphone holder and the microphone moved horizontally at the rear side of the keyboard.
Figure 2:
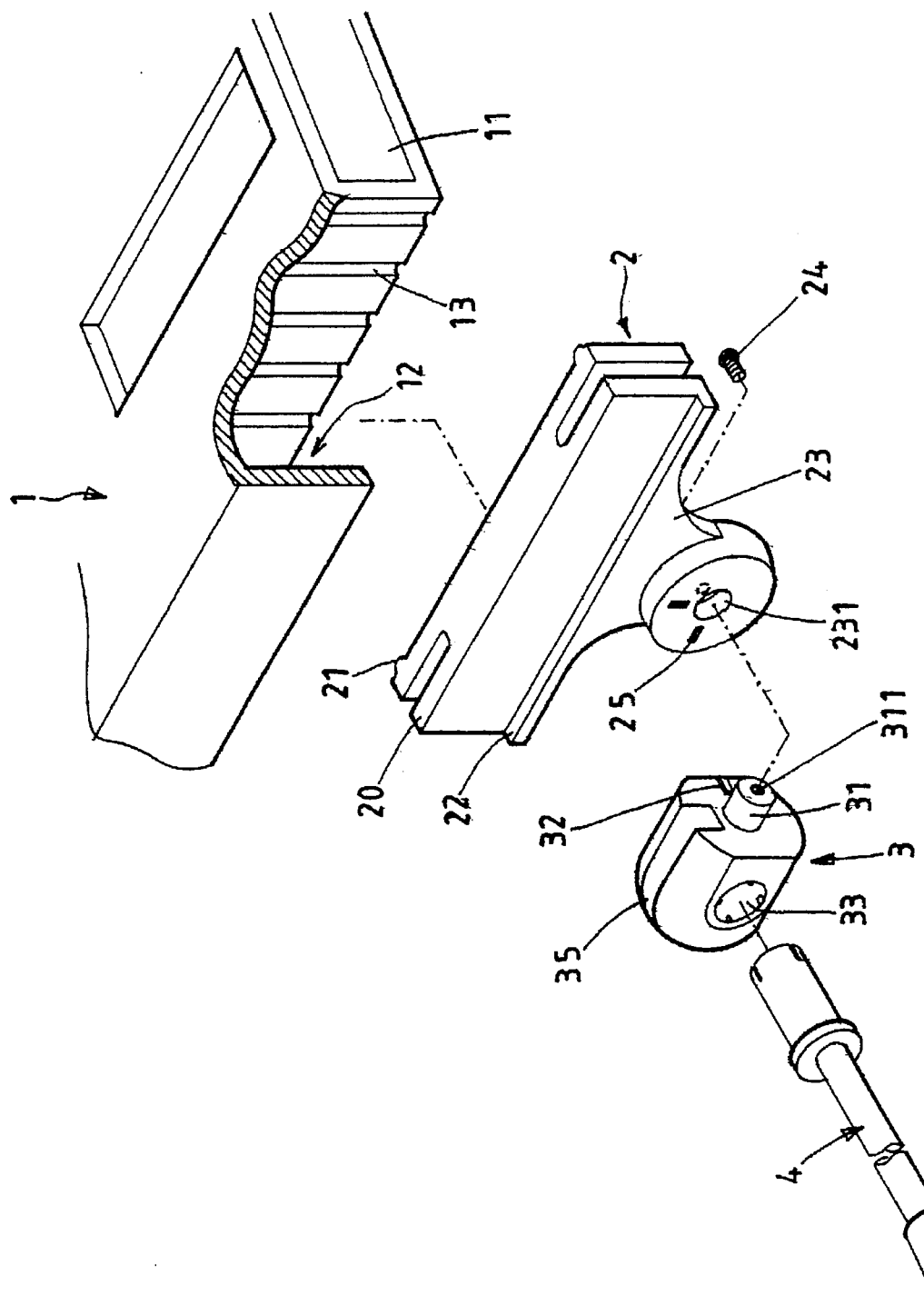
FIG. 2 is an exploded view of the present invention.

Referring to FIGS. 1 and 2, a microphone mounting structure in accordance with the present invention is generally comprised of a keyboard 1, a slide carrier 2, a microphone holder 3, and a microphone 4.

Figure 4:
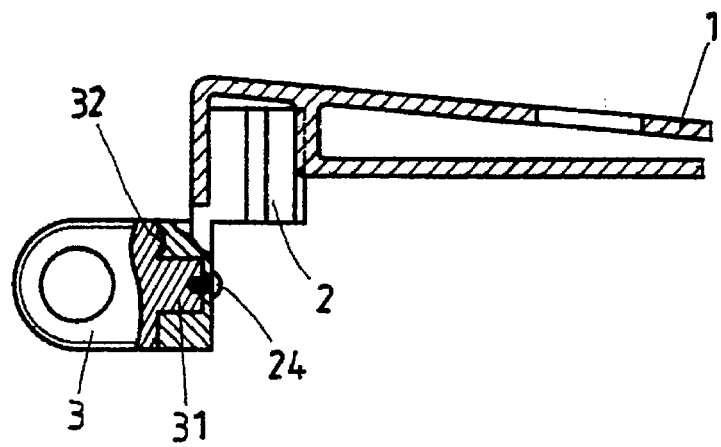
FIG. 4 is another sectional assembly view of the present invention when viewed from another angle.

Referring to FIG. 4 and FIG. 1 again, the keyboard 1 comprises a top cover shell 11. The top cover shell 11 of the keyboard 1 comprises a horizontal bottom chamber 12 near the rear side, and a plurality of equally spaced vertical locating grooves 13 respectively disposed in parallel inside the horizontal bottom chamber 12. Further, the keyboard 1 has a wire hole 14 at one lateral side through which the flexible electric cord 341 of the microphone 4 passes.

Figure 3:
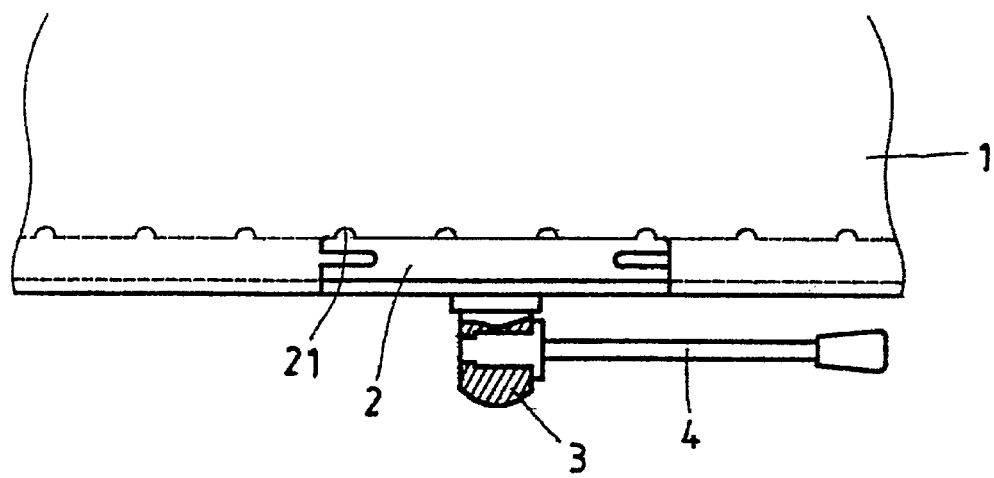
FIG. 3 is a sectional assembly view of the present invention.

Referring to FIGS. 3 and 4 and FIG. 2 again, the slide carrier 2 comprises a base block 20 slidably mounted in the horizontal bottom chamber 12, a pair of vertical locating ribs 21 bilaterally raised from the base block 20 at the back and adapted for engaging the vertical locating grooves 13 of the top cover shell 11 of the keyboard 1, an outward horizontal rib 22 raised from the front side at the bottom adapted for stopping at the bottom edge of the top cover 11, a supporting block 23 downwardly extending from the outward horizontal rib 22 through which the slide carrier 2 can be moved with the hand in the horizontal bottom chamber 12 to shift the vertical locating ribs 21 leftwards or rightwards between the vertical locating grooves 13, a through hole 231 at the supporting block 23 adapted for securing the microphone holder 3 and the microphone 4, and two locating holes 25 spaced for example at right angles around the through hole 231.

Figure 5:
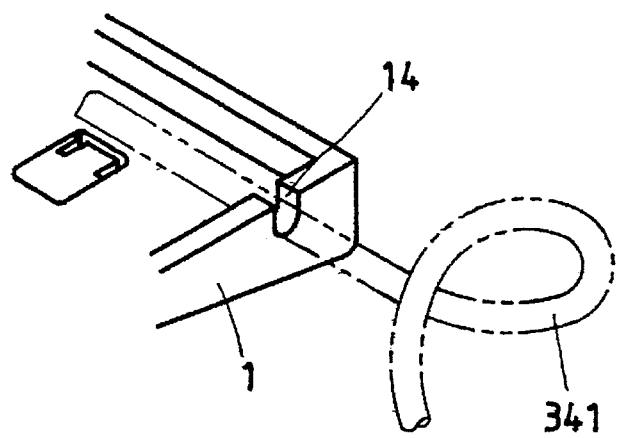
FIG. 5 shows a wire hole formed in the keyboard at one lateral side, and an electric cord inserted through the wire hole.

Referring FIG. 5 and Figures from FIGS. 1 to 4 again, the microphone holder 3 comprises a mounting rod 31 raised from one side and inserted into the through hole 231 of the slide carrier 23 and secured in place by threading a screw rod 24 into a screw hole 311 at the end of the mounting rod 31, a locating rib 32 disposed adjacent to the mounting rod 31 and adapted for engaging one locating hole 25 of the supporting block 23, a plug hole 33 spaced from the mounting rod 31 at right angles and adapted for holding the microphone 4, and a wire groove 35 at a suitable location for receiving the electric cord 341 of the microphone 4.

Referring to Figures from FIGS. 1 to 5 again, when in use, the microphone holder 3 is turned in the through hole 231 of the supporting block 23 to force the locating rib 32 into one locating hole 25 of the supporting block 23, permitting the microphone 4 to be turned from a horizontal position (as shown in FIG. 3) to a vertical position (as shown in FIG. 1), and then the slide carrier 2 is moved in the horizontal bottom chamber 12 leftwards or rightwards to the desired location for picking up the user's voice (see FIG. 1).

While only one embodiment of the present invention has been shown and described, it will be understood that various modifications and changes could be made thereunto without departing from the spirit and scope of the invention disclosed.

What the invention claimed is:

1. A microphone mounting structure comprising:
    a keyboard having a top cover shell defining a horizontal bottom chamber near a rear side thereof, and a plurality of equally spaced vertical locating grooves inside said horizontal bottom chamber;
    a slide carrier slidably mounted in the horizontal bottom chamber of said keyboard, said slide carrier comprising a pair of vertical locating ribs bilaterally raised from a back side thereof and detachably forced into engagement with the vertical locating grooves of the top cover shell of said keyboard, an outward horizontal rib raised from a bottom of a front side thereof and stopping at a bottom edge of said top cover shell, a supporting block downwardly extending from said outward horizontal rib through which said slide carrier can be moved with the hand in a user's horizontal bottom chamber of said keyboard to shift said vertical locating ribs leftwards or rightwards between the vertical locating grooves of the top cover shell of said keyboard, a microphone holder mounting hole at said supporting block, and two locating holes spaced at an angle around said microphone holder mounting hole;

a microphone holder coupled to the supporting block of said slide carrier, said microphone holder comprising a mounting rod raised from one side and coupled to the microphone holder mounting hole of the supporting block of said slide carrier, a locating rib disposed adjacent to said mounting rod and forced into engagement with one locating hole of the supporting block of said slide carrier, and a plug hole spaced from said mounting rod at right angles and adapted for holding a microphone; and a microphone mounted in the plug hole of said microphone holder and having an electric cord connected to a power supply.

2. The microphone mounting structure of claim 1 wherein the mounting rod of said microphone holder has a longitudinal screw hole into which a screw is threaded to secure said mounting rod in the microphone holder mounting hole of the supporting block of said slide carrier.

3. The microphone mounting structure of claim 1 wherein said microphone holder has a wire groove adapted for receiving the electric cord of said microphone.

4. The microphone mounting structure of claim 1 wherein said keyboard has a wire hole at one lateral side through which the electric cord of said microphone passes.

* * * * *